United States Patent [19]

Chen et al.

[11] Patent Number: 5,283,942
[45] Date of Patent: Feb. 8, 1994

[54] SACRIFICIAL LAYER PLANARIZATION PROCESS FOR FABRICATING A NARROW THIN FILM INDUCTIVE HEAD

[75] Inventors: Mao-Min Chen; Jyh-Shuey J. Lo; Po-Kang Wang, all of San Jose, Calif.

[73] Assignee: International Business Machines Corporation, Armonk, N.Y.

[21] Appl. No.: 998,085

[22] Filed: Dec. 29, 1992

[51] Int. Cl.$^5$ .............................................. G11B 5/42
[52] U.S. Cl. .................................... 29/603; 360/125; 427/131
[58] Field of Search ................ 29/603; 427/130–132; 360/119–121, 125–127

[56] References Cited

U.S. PATENT DOCUMENTS

| | | | |
|---|---|---|---|
| 4,436,593 | 3/1984 | Osborne et al. | 204/15 |
| 4,837,924 | 6/1989 | Lazzari | 29/603 |
| 4,992,901 | 2/1991 | Keel et al. | 29/603 X |
| 5,137,750 | 8/1992 | Amin et al. | 29/603 X |

OTHER PUBLICATIONS

"Thin Film Head With Staggered Pole Tips", by Wang et al, IEEE Transactions on Magnetics, vol. 27, No. 6, Nov. 91, pp. 4710–4712.

"Fabrication of Thin Film Inductive Heads With Top Core Separated Structure", Kawabe et al, IEEE Transactions on Magnetics, vol. 27, No. 6, Nov. 91, pp. 4936–4938.

Primary Examiner—Carl E. Hall
Attorney, Agent, or Firm—Baker, Maxham, Jester & Meador

[57] ABSTRACT

A process for producing a planar thin film magnetic head wherein a sacrificial layer is introduced to provide control of the gap planarization procedure. Unbounded planar layers of lower pole-tip material and nonmagnetic gap material are first deposited and covered with a sacrificial layer that may be selectively removed by solvent. A critical layer island is then formed by etching the excess, thereby ensuring ideal planar characteristics at the edges of the critical gap layer. Following island formation, the entire assembly is covered with a nonmagnetic insulating layer and lapped or etched smooth. This planarization process is adjusted to end in the sacrificial layer. The remaining sacrificial layer material is then removed by solvent, a step that not only ensures the integrity of the underlying critical gap and pole layers but also creates the upper step needed for staggered pole-tip and conformal pole-tip head configurations.

22 Claims, 7 Drawing Sheets

SACRIFICIAL LAYER PLANARIZATION PROCESS FOR FABRICATING A NARROW THIN FILM INDUCTIVE HEAD

CROSS-REFERENCES TO RELATED APPLICATIONS

Copending application entitled "Submicron Thin Film Inductive Head With Self-Aligned Staggered Pole-Tips" filed on even date herewith as Application Serial Number 998,171 is incorporated herein in its entirety by this reference. Copending application entitled "Thin Film Planarization Process For Fabricating Magnetic Heads Employing A Stitched Pole Structure" filed on even date herewith as Application Serial Number 998,173 is also incorporated herein in its entirety by this reference. These copending applications are related to this application through common inventorship.

BACKGROUND OF THE INVENTION

1. Field of the Invention

This invention relates generally to thin film magnetic head fabrication processes and, more specifically, to a sacrificial layer process for fabricating a narrow inductive head having a submicron track width.

2. Discussion of the Related Art

Thin film magnetic read/write heads are used for reading and writing magnetically coded data stored on a magnetic storage medium such as a magnetic disk or magnetic tape. There is a continuing strongly-felt need for increasing the data storage density in such media. Most efforts to increase magnetic data storage density involve techniques for increasing the areal bit density in the magnetic medium.

In rotating magnetic disk drives, the areal density is equivalent to the product of the number of flux reversals per millimeter and the number to tracks available per millimeter of disk radius. Thus, high areal data storage density requires recording heads with high linear resolution and narrow track-width. The linear resolution of a two-pole inductive head is related to the gap between the pole-tips at the air bearing surface (ABS). In the present art, submicron gaps are commonly available. Recent improvements in magnetoresistive (MR) sensor fabrication have led to development of the dual element head, which combines MR read and inductive write elements. This dual element approach solves the low read-back signal sensitivity problem associated with narrow inductive heads. Thus, increased linear recording is now obtainable without incurring unnecessary penalties in lost signal sensitivity.

In pushing the areal density limit in magnetic recording using the dual MR-inductive element approach, the problems associated with fabricating narrow-track inductive write heads are now more limiting than the problems associated with fabricating narrow-track MR read heads. Experimental and mathematical modeling results confirm that further substantial increases in areal recording density must come from reductions in track width rather than from increases in linear flux transition densities in the recording media.

The major barrier to narrower track widths imposed by conventional thin film inductive head fabrication techniques is the topographical variation confronted when defining the upper pole-tip width. Because of this varied topography, conventional thin film techniques require the narrow upper pole-tip to be deposited at the bottom of a 15-18 micron photoresist groove. Unreliable results are well-known for attempted deposition of a layer width of one to three microns at the bottom of a 15-20 micron groove depth. Several new pole-tip fabrication approaches have been proposed to address this problem.

One such is the "staggered" pole-tip magnetic head design, which is inherently different from the thin film inductive head designs of the earlier art. As used herein, "staggered" pole-tips means pole-tips that are overlapped to form a narrow gap in the overlap region. The gap width is often much narrower than either of the overlapping pole-tips. Po-Kang Wang, et al ("Thin Film Head With Staggered Pole-tips", *IEEE Transactions on Magnetics*, Vol. 27, No. 6, November 1991, pp. 4710–4712) propose a cost-effective longitudinal staggered pole-tip configuration and an alternative transverse staggered pole-tip configuration both suitable for submicron track-widths. Wang, et al report that both configurations should be suitable for narrow track applications but they found that conventional process variations provided low-yield fabrication of staggered pole-tips in the transverse configuration and they were unable to reliably fabricate any submicron track-widths in the longitudinal configuration. Because of the particular problems imposed by the conventional process employed, a slanted and uneven ABS gap was obtained (e.g., FIGS. 2 and 3).

Other practitioners avoid the track-width limitations of variable topography by using a "stitched" upper pole concept that defines the upper pole-tip immediately following the deposition of the insulating gap defining material. As used herein, a "stitched" pole is a pole formed in two or more separate steps, such as where a pole-tip is first deposited and a pole-yoke later deposited and joined (stitched) to the existing pole-tip. For instance, T. Kawabe, et al ("Fabrication of Thin Film Inductive Heads With Top Core Separated Structure", *IEEE Transactions on Magnetics*, Vol. 24, No. 6, November 1991, pp. 4936–4938) discusses a pole-tip stitching method where the upper pole-tip is formed at an early point in the fabrication process when a shallow photoresist layer can still be used as a pole-tip mask. However, Kawabe, et al neither teach nor suggest a method for ensuring proper formation of the junction between the pole-tip and the pole-yoke portions of the upper pole.

The "self-aligning" pole-tip fabrication methods known in the art may also result in improved yield of narrow-track heads, as can be understood with reference to three typical disclosures. In U.S. Pat. No. 4,436,593, John R. Osborne, et al disclose a self-aligned pole-tip fabrication method for precisely aligning the pole-tips of a thin film magnetic head. Osborne, et al teach the use of the upper pole as a mask for etching the lower pole, thereby insuring pole-tip alignment at a narrow gap region. In U.S. Pat. No. 4,992,901, Beat Keel, et al teach a self-aligning method for fabricating magnetic poles using a sacrificial mask layer. Keel, et al use a sacrificial mask to protect the upper pole-tip while removing the exposed non-aligned portions of the gap-forming material and lower pole-tip. They first deposit the upper pole and sacrificial mask layers in a hole cut away from a thick photoresist mask layer and then use these built-up elements as a mask for etching away the excess in the lower layers. In U.S. Pat. No. 4,837,924, Jean-Pierre Lazzari teahes a process for the production of a planar thin film magnetic head where a recessed slot is etched in a substrate and filled with a magnetic film. Thus, like Keel et al, Lazzari teaches a process of first etching a defined hole in a substrate, next filling the hole with material, and finally using the material thus deposited as a mask for further etching in the layers below the deposited material. This procedure is now well-known and generally accepted as the preferred method for depositing narrow layers of thin film materials.

Although the stitched pole concept, the staggered pole concept and the self-aligning pole-tip concept all appear useful for fabricating inductive write heads having track widths under three microns, existing thin film fabrication procedures do not provide acceptable yields. For instance, submicron track widths can be fabricated using the staggered head approach without encountering lithographic resolution or aspect ratio problems but founder on problems of planarization control. Both staggered head and stitched head designs require well-controlled planarization processes and the staggered head requires a method for adding a precise step on each pole-tip to reduce side-writing effects.

Unfortunately, conventional methods do not ensure uniform planar gap regions in inductive heads having track widths under three microns. FIG. 2 shows an outline of a photomicrograph of the ABS aspect of a 2.5 micron staggered pole head. Note the extreme curvature and bleeding effects where the two pole-tips $P_1$ and $P_2$ abut the nonmagnetic insulating wall 10 defining the stepped edge of the staggered pole recording (flux-sensing) gap 12. Note the skewing of recording gap 12 with respect to the gap centerline 14. Similarly, FIG. 3 shows the ABS aspect view of a 0.5 micron staggered inductive head having a gap 16 that is almost entirely tilted with respect to the gap centerline 18 because of similar edge deposition effects at the insulating wall 20. There is a clearly felt need in the art for a fabrication method that reliably produces submicron gap widths in thin film staggered-pole heads. The related unresolved problems and deficiencies are clearly felt in the art and are solved by this invention in the manner described below.

SUMMARY OF THE INVENTION

It is an object of this invention to eliminate edge-distortion in the pole-tip gap. This invention solves the above staggered pole-tip fabrication problems by inverting the conventional "island in a hole" fabrication concept. Instead of depositing the critical lower pole-tip and gap-forming elements in a hole formed in another planar layer, the method of this invention first deposits the necessary materials as unbounded planar layers and then etches away all excess to form an island containing the critical lower pole-tip and gap-forming elements. Without edges, the depositions occur without distortion from edge effects. It is an advantage of the method of this invention that the "distortion" effects noted during submicron gap deposition are entirely avoided through an improved method of planarization.

It is yet another object of this invention to provide a method that ensures planarization of the submicron inductive head gap. This invention introduces a sacrificial layer and a planarization process that can be adjusted to end in the middle of the sacrificial layer, which may then be selectively removed by etching. It is a feature of this invention that a sacrificial layer is used to buffer the underlying critical layers during planarization.

It is another object of this invention to provide a reliable means for fabricating a step in the upper pole-tip to reduce the critical side writing and reading effects in both the staggered and conformal pole-tip head configurations. It is a feature of the method of this invention that the sacrificial layer portion remaining following planarization is then used to create the step required in either a staggered or conformal pole-tip head configuration.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 1, comprising

FIG. 8, comprising FIG. 9, comprising

DETAILED DESCRIPTION OF THE PREFERRED EMBODIMENTS

Figure 1A:
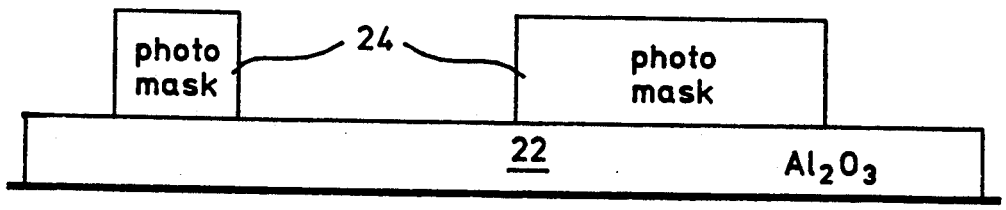
FIGS. 1A–1C, shows an etch-and-fill thin film fabrication technique from the prior art.
Figure 1B:
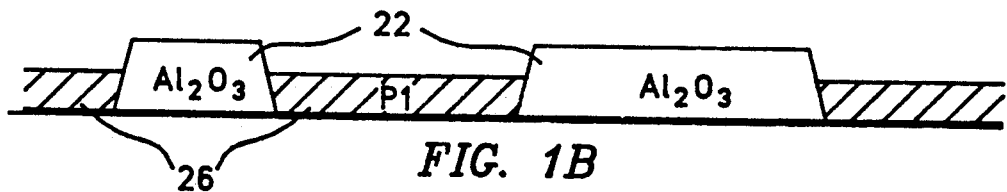
Figure 1C:
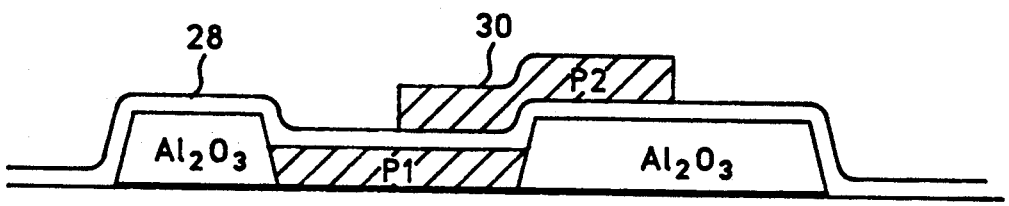

FIG. 1, consisting of FIGS. 1A–1C, illustrates a thin film fabrication method in the prior art applied to fabrication of an overlapping or "staggered" pole-tip configuration. In FIG. 1A, a base layer 22 of alumina is covered with a photoresist mask pattern 24. The exposed portions of layer 22 are then removed by etching and a lower pole layer 26 is deposited in the gaps left in layer 22. Layer 26 makes up the $P_1$ pole-tip element of the record head (FIG. 1B). A thin gap-forming layer 28 is next deposited over the entire assembly (FIG. 1C). The upper pole-tip 30 is then finally deposited by frame plating to complete an overlapping pair of pole-tips separated by the thin gap, thereby forming the inductive recording head. The remaining routine coil deposition and covering steps are omitted from this discussion.

Figure 2:
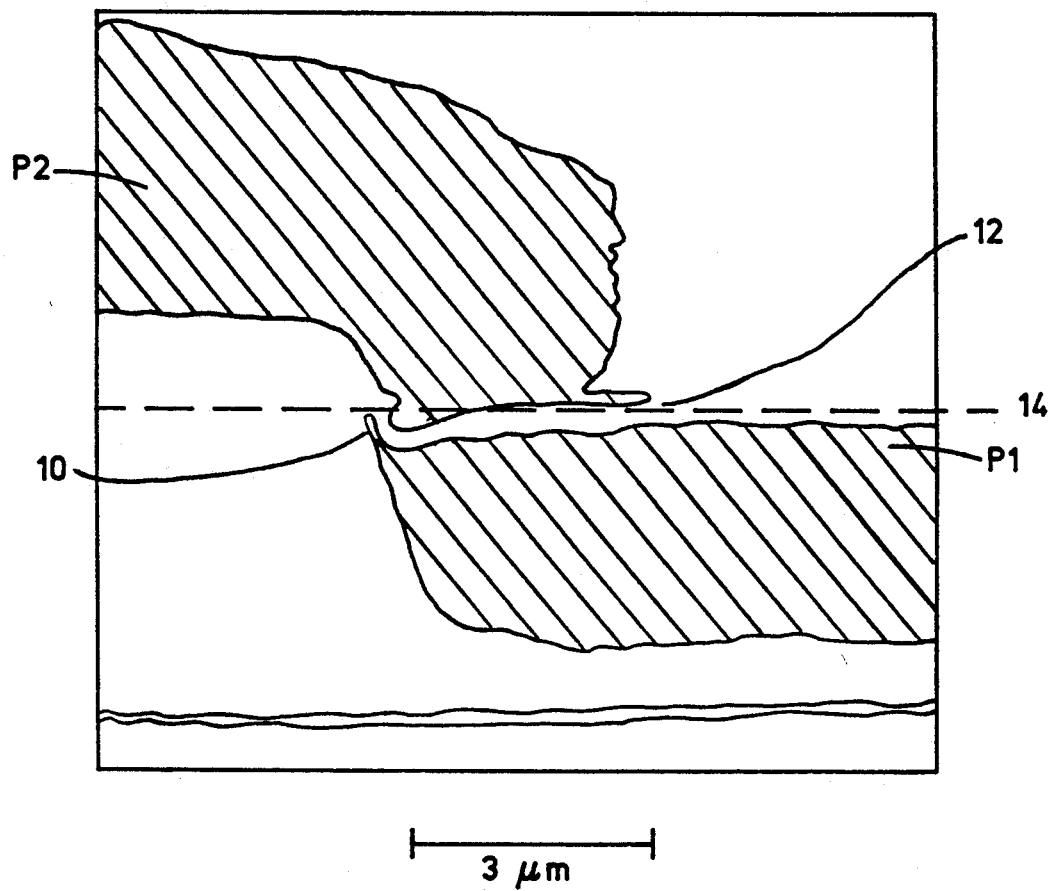
FIG. 2 shows the ABS aspect of a 2.5 micron staggered pole-tip head fabricated in accordance with the method from FIG. 1.
Figure 3:
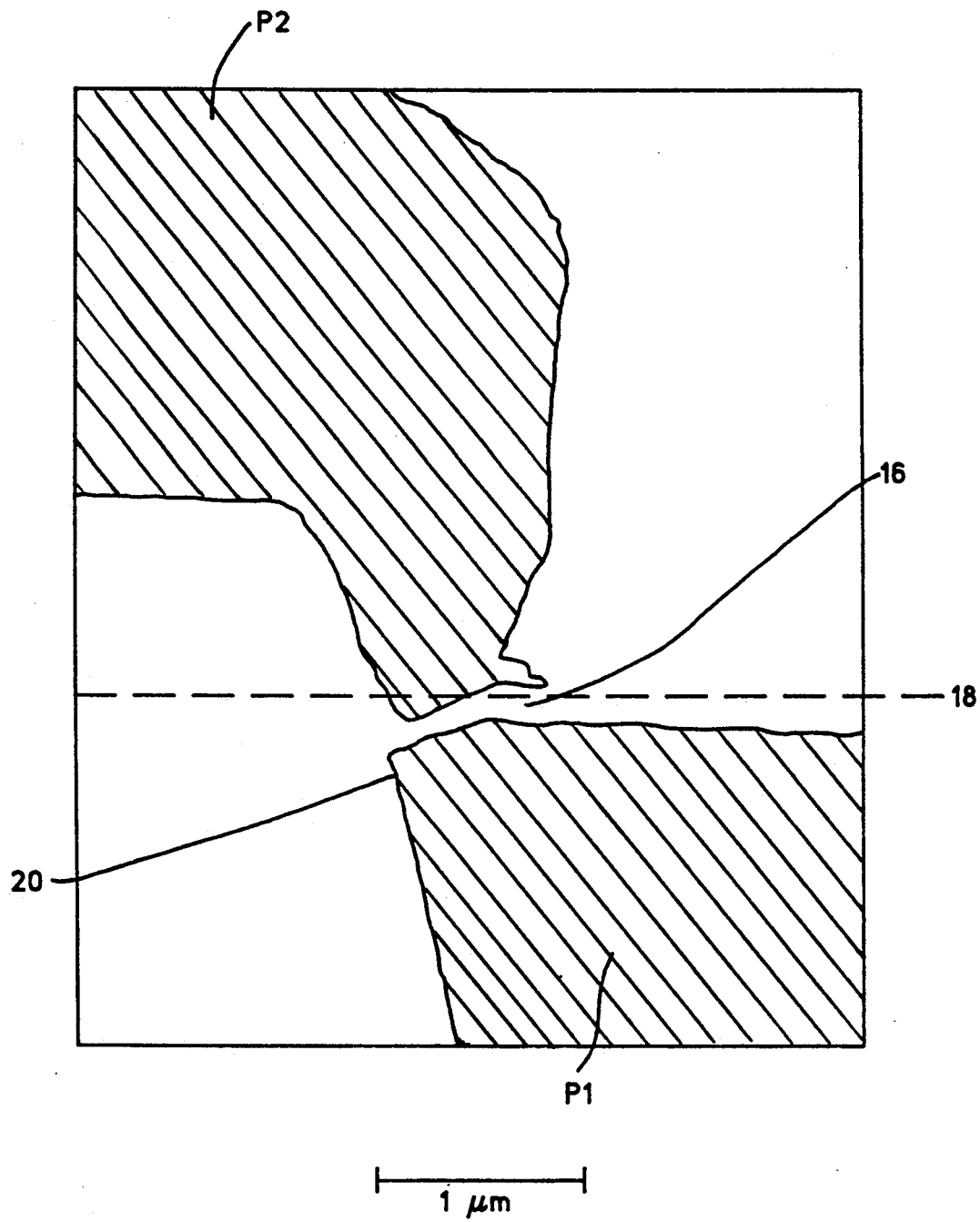
FIG. 3 shows the ABS aspect of a 0.5 micron staggered pole-tip head fabricated in accordance with the method from FIG. 1.

The fabrication problems associated with the method in FIG. 1 can be appreciated by examining the contours taken from two ABS photomicrographs shown in FIGS. 2 and 3. FIG. 2 shows gap 12 formed by the 2.5 micron overlap of pole-tips $P_1$ and $P_2$ at gap centerline 14. FIG. 3 shows gap 16 extending 0.5 microns along gap centerline 18 formed by the overlap of pole-tips $P_1$ and $P_2$. The problems with gap curvature and misalignment are created by the distortion of the deposition of both $P_1$ and $P_2$ layers at walls 10 (FIG. 2) and 20 (FIG. 3) of etched base layer 22 (FIG. 1). Walls 10 and 20 create distortions out to 100 nm or so along gap centerlines 14 and 18. For gap lengths exceeding 3 microns, the resulting gap distortion is acceptably small in size relative to the gap length. However, for gap lengths less than 3 microns, the distortion effects become appreciable and, for submicron gaps such as that shown in FIG. 3, nearly half of the entire tracking width is distorted.

Figure 4:
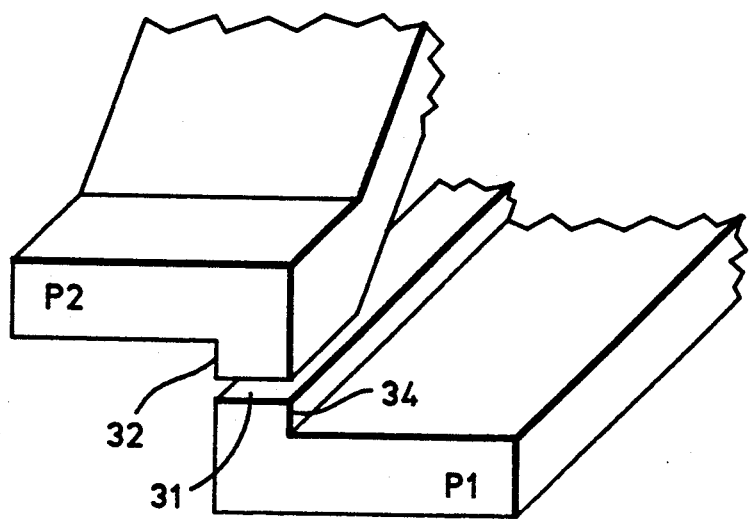
FIG. 4 shows a schematic representation of the ABS aspect of a stepped transverse staggered pole-tip head structure.

FIG. 4 shows the schematic representation of the ABS aspect of a stepped transverse staggered pole-tip head structure disclosed in the first of the related patent applications cited hereinabove. The staggered head geometry is useful because neither the $P_1$ or $P_2$ pole-tips need be less than several microns wide to form a submicron gap width 31 representing the overlap of the two pole-tips. The configuration in FIG. 4 differs from the staggered pole-tip head known in the art because of the step 32 in pole-tip $P_2$ and the step 34 in the pole-tip $P_1$.

Figure 5:
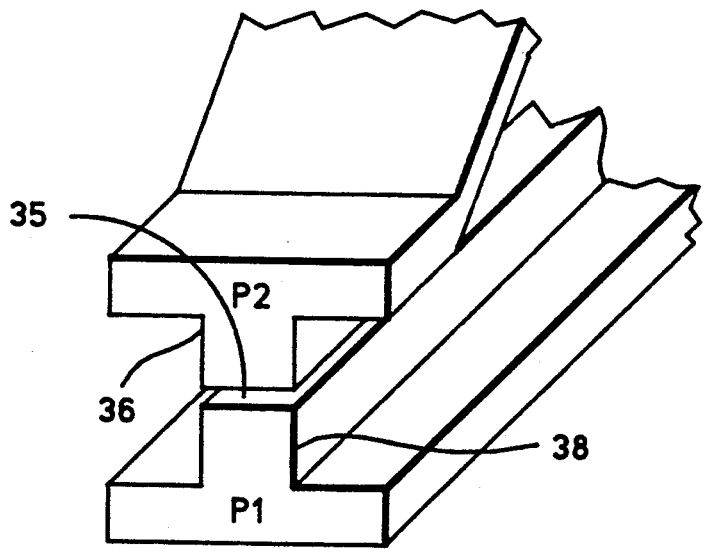
FIG. 5 shows a schematic representation of the ABS aspect of a stepped conformal pole-tip head structure.

FIG. 5 shows a schematic representation of the ABS aspect of a stepped conformal pole-tip head structure that is similarly useful but which requires selfaligning fabrication technology to reliably create the portions of $P_1$ and $P_2$ having submicron width at the gap 35. The pole-tip configuration in FIG. 5 differs from the inductive head known in the art by virtue of the step 36 in pole-tip $P_2$ and the step 38 in pole-tip $P_1$. Both of the pole-tip geometries shown in FIGS. 4 and 5 can be fabricated by the method of this invention, which avoids the gap distortion problems discussed above in connection with FIGS. 1-3.

Figure 6:
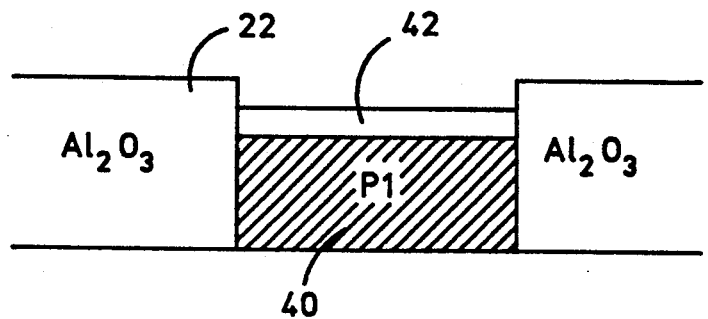
FIG. 6 shows a schematic representation of the lower pole-tip and gap layers for the stepped head configuration from FIG. 4.
Figure 7:
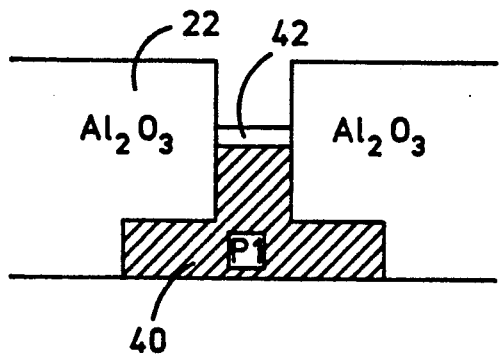
FIG. 7 shows a schematic representation of the lower pole-tip and gap layers for the stepped head configuration from FIG. 5.

FIG. 6 shows the lower pole-tip layer 40 and the gap forming layer 42 that would be deposited in a hole etched in base layer 22 using the method discussed above in connection with FIG. 1. Similarly, FIG. 7 shows layers 40 and 42 as they would appear using the fabrication method of FIG. 1 to produce the stepped conformal pole-tip head of FIG. 5. The methods illustrated in FIGS. 6 and 7 are both subject to distortion in the first 100 nm or so at the walls of the holes formed in base layer 22.

The method of this invention for producing the stepped transverse staggered pole-tip head structure of FIG. 4 is now described with reference to FIG. 8. A first layer 44 of ferromagnetic material is deposited on a substrate to form the $P_1$ element. Layer 44 is unlimited with respect to the submicron tracking width desired. A second layer 46 of gap-forming material such as alumina or silica is then deposited over layer 44 to a thickness equal to the desired gap thickness.

Next, again referring to FIG. 8A, a third sacrificial layer 48 is deposited over layer 46 using a material such as chrome, copper or silicon. The only important criterion for selecting the sacrificial material is that the etching rate of the sacrificial layer for a special solvent be very high relative to the etching by that solvent of any underlying material. Chrome can be quickly etched with a specific solvent that has no significant effect on alumina or other underlying materials, as is well-known in the art.

Figure 8A:
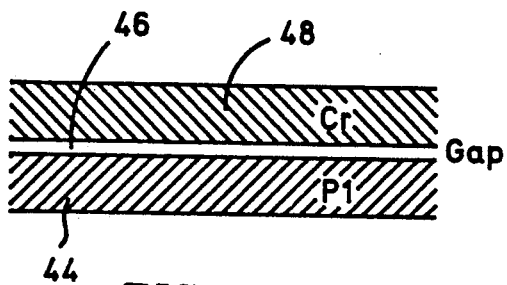
FIGS. 8A–8F, shows the fabrication method of this invention applied to making the stepped head configuration from FIG. 4.
Figure 8D:
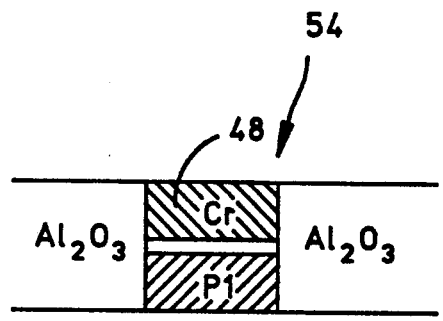
Figure 8B:
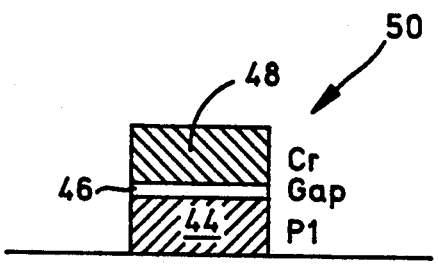
Figure 8E:
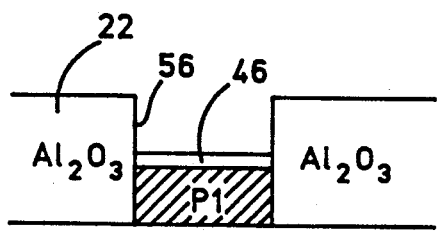

Referring to FIG. 8B, the lower pole-tip pattern for the $P_1$ pole is then deposited by photoresist (not shown) and etched using subtractive etching techniques. Following this masking and etching process, a raised lower pole structure 50 remains. Because the side walls of structure 50 are formed through subtractive etching, gap 46 remains perfectly flat and undistorted at the edges.

Figure 8C:
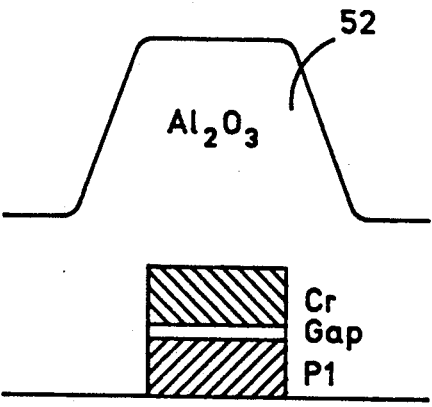

In FIG. 8C, an insulating layer 52 is then deposited over everything to a thickness greater than the height of structure 50. In FIG. 8D, the upper portion of layer 52 is removed through some planarizing process such as mechanical lapping or resist/polymer planarization to form a planarized lower pole structure 54. This planarization process must remove enough material to expose sacrificial layer 48 but must leave some portion of layer 48 following planarization. Planarization can be adjusted to control the heighth of the step 56 shown in FIG. 8E.

After completion of the planarization process creating step 56, the remaining material in sacrificial layer 48 is removed by etching with a selective solvent. Step 56 is left unchanged by this etching process (FIG. 8E) because the solvent selected to remove the remaining sacrificial material has no material etching effect on base layer 22 or gap layer 46. Step 56 is essential to the proper functioning of the stepped transverse staggered pole-tip structure of FIG. 4 because it minimizes the side-writing problem known in the art.

Figure 8F:
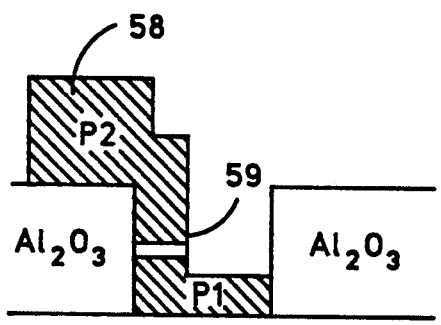

Finally, in FIG. 8F, a ferromagnetic layer 58 is deposited through a mask to form the upper pole $P_2$ element as shown and the step 59 is etched into lower pole-tip 44. All remaining insulation, coil formation and interconnection steps then proceed in any useful manner known in the art or in any manner disclosed in the related patent applications cited hereinabove.

FIG. 9 shows how the method of this invention is used to fabricate the stepped conformal pole-tip head structure shown in FIG. 5. First, the $P_{1s}$ element 60 is created using any useful method known in the art such as frame plating. In FIG. 9B, a multilayer raised pole structure 62 is built up on $P_{1s}$ element 60. Element 60 defines the lower pole region. As used herein, the lower pole region includes a lower pole-yoke region and a lower pole-tip region. As used herein, raised pole structure 62 is limited to the lower pole-tip region. For the conformal pole-tip structure, both lower and upper pole-tip regions are coincident. Raised pole structure 62 includes the lower pole-tip $P_{1t}$ layer 64, the gap-forming layer 66, the upper pole-tip $P_{2t}$ layer 68 and the sacrificial material layer 70. As in FIG. 8, the upper and lower pole layers 60, 64 and 68 are made of any suitable ferromagnetic material such as permalloy. Gap-forming layer 66 is made of any suitable nonmagnetic insulating material such as alumina or silica. Sacrificial layer 70 is preferably chrome but may also be some other similarly useful material that can be removed with a specific solvent that has no significant effect on underlying materials. Multilayer raised pole structure 62 is formed in the same manner shown in FIGS. 8A and 8B. This multilayer films are deposited in a wide region and then formed by using a photoresistant mask and a substructure etching procedure.

Figure 9A:
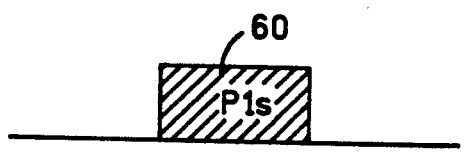
FIGS. 9A–9F, shows the fabrication method of this invention applied to making the stepped head configuration from FIG. 5.
Figure 9D:
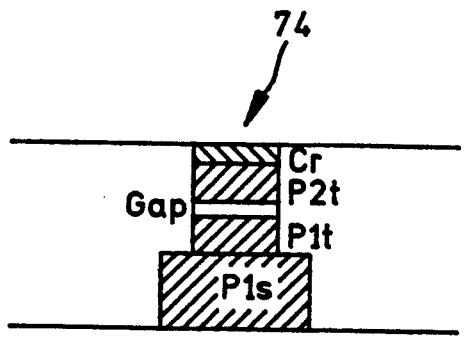
Figure 9B:
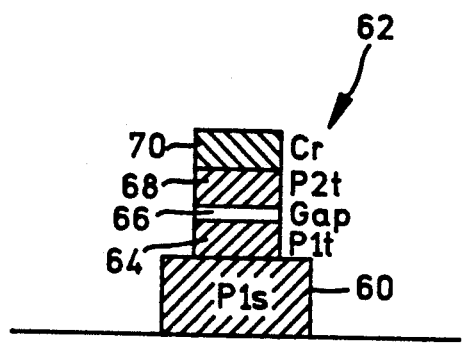
Figure 9E:
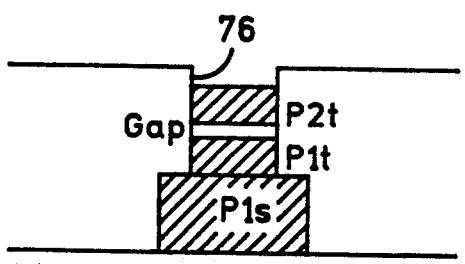
Figure 9C:
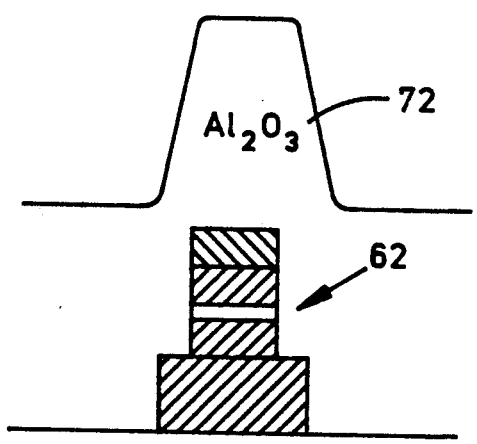
Figure 9F:
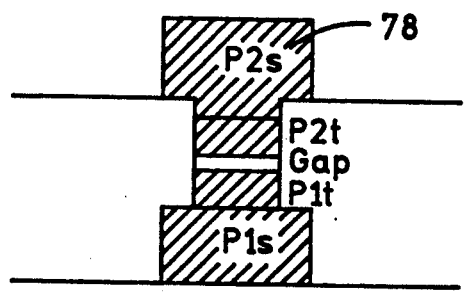

In FIG. 9C, multilayer raised pole structure 62 is covered with a thicker insulating layer 72, which is then planarized to form the planarized pole structure 74 shown in FIG. 9D. Layer 72 is preferably alumina but may also consist of another material with similarly useful properties such as silica. Again, as in the above discussion in connection with FIG. 8D, the planarization can be performed by mechanical lapping, chemical etching or a combination, and must remove enough material to expose sacrificial layer 70 but also must leave some portion of layer 70 to form the step 76 (FIG. 9E) needed to shape the upper pole-tip element.

The remaining sacrificial material in layer 70 is then removed by chemical etching without affecting the thickness of any surrounding or underlying layers, as shown in FIG. 9E. Finally, after completing the usual coil and insulation processes (not shown) in accordance with any useful method known in the art, the upper pole-yoke $P_{2s}$ element 78 is added using any useful technique known in the art such as frame plating. Element 78 consists of a ferromagnetic material such as permalloy.

The method of this invention permits the use of a non-critical sacrificial layer as a buffer layer for both planarization to preserve the thickness and integrity of underlying critical layers and to create the upper step necessary to complete the stepped pole-tip configurations discussed above. This shaping step (step 56 in FIG. 8E and step 76 in FIG. 9E) can be carefully controlled without introducing the gap distortion experienced when using the hole-filling fabrication methods from the prior art.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for fabricating a thin film magnetic head having two staggered pole-tips separated by a gap region, said method comprising the steps of:
    (a) depositing a first planar layer of ferromagnetic pole material on a substrate;
    (b) depositing a second planar layer of nonmagnetic gap material over said first planar layer;
    (c) depositing a third planar layer of sacrificial material over said second planar layer to form a first assembly;
    (d) defining a lower pole region of said first assembly;
    (e) removing all material in said first, second and third planar layers outside of said lower pole region to form a raised lower pole structure;
    (f) depositing a fourth layer of nonmagnetic insulating material over said raised lower pole structure to form a second assembly;
    (g) removing from said second assembly all material beyond a plane disposed further from said substrate than the bottom of said third planar layer and closer to said substrate than the top of said third planar layer, thereby forming a planarized lower pole structure;
    (h) removing from said planarized lower pole structure all remaining said sacrificial material in said third planar layer to form a stepped lower pole structure;
    (i) defining an upper pole-tip region of said stepped lower pole structure; and
    (j) depositing a fifth layer of ferromagnetic pole material over said upper pole-tip region of said stepped lower pole structure, thereby completing the formation of said two staggered pole-tips.

2. The method of claim 1 wherein said depositing step (c) includes the additional step of:
    (c.1) selecting said sacrificial material from a group consisting of chrome, copper and silicon.

3. The method of claim 2 wherein, said removing steps (e) and (h) are performed through subtractive etching by a solvent.

4. The method of Claim 3 wherein said defining steps (d) and (i) include the step of:
    depositing a photoresist layer over the respective structure.

5. The method of claim 4 wherein said removing step (g) includes the step of:
    (g.1) lapping said second assembly to remove all material above said plane.

6. The method of claim 1 wherein said second and fourth planar layers include material selected from a group consisting of silica and alumina.

7. The method of claim 1 wherein said first and fifth planar layers include permalloy.

8. The method of claim 1 wherein said removing step (g) comprises the additional steps of:
    (g.1) depositing a mask layer on a portion of said second assembly;
    (g.2) etching the exposed portion of said second assembly until said second assembly has a planar surface; and
    (g.3) etching all of said second assembly planar surface until said third layer material is exposed to the surface.

9. The method of claim 1 wherein, said removing steps (e) and (h) are performed through subtractive etching by a solvent.

10. The method of claim 1 wherein said defining steps (d) and (i) include the step of:
    depositing a photoresist layer over the respective structure.

11. The method of claim 1 wherein said removing step (g) includes the step of:
    (g.1) lapping said second assembly to remove all material above said plane.

12. A method for fabricating a thin film magnetic head having two conformal pole-tips separated by a gap region, said method comprising the steps of:
    (a) depositing a first planar layer of ferromagnetic pole material on a substrate;
    (b) depositing a second planar layer of ferromagnetic pole material over said first planar layer;
    (c) depositing a third planar layer of non-magnetic gap material over said second planar layer;
    (d) depositing a fourth planar layer of ferromagnetic pole material over said third planar layer;
    (e) depositing a fifth planar layer of sacrificial material over said fourth planar layer to form a first assembly;
    (f) defining a lower pole-tip region of said first assembly;
    (g) removing all material in said second, third, fourth and fifth planar layers outside of said lower pole-tip region to form a raised pole structure;
    (h) depositing a sixth layer of non-magnetic insulating material over said raised pole structure to form a second assembly;
    (i) removing from said second assembly all material beyond a plane disposed further from said substrate than the bottom of said fifth planar layer and closer to said substrate than the top of said fifth planar layer, thereby forming a planarized pole structure;
    (j) removing from said planarized pole structure all remaining said sacrificial material in said fifth planar layer to form a stepped pole structure;

(k) defining an upper yoke region of said stepped pole structure; and (l) depositing a seventh planar layer of ferromagnetic pole material over said upper yoke region of said stepped pole structure, thereby completing formation of said two conformal pole-tips.

13. The method of claim 12 wherein said depositing step (e) includes the additional step of:

(c.1) selecting said sacrificial material from a group consisting of chrome, copper and silicon.

14. The method of claim 13 wherein, said removing steps (g) and (j) are performed through subtractive etching by a solvent.

15. The method of claim 14 wherein said defining steps (f) and (k) include the step of:

depositing a photoresist layer over the respective structure.

16. The method of claim 15 wherein said removing step (i) includes the additional step of:

(g.1) lapping said second assembly to remove all material above said plane.

17. The method of claim 12 wherein said second and fourth planar layers include material selected from a group consisting of silica and alumina.

18. The method of claim 12 wherein said first, second, fourth and seventh planar layers include permalloy.

19. The method of claim 12 wherein said removing step (i) comprises the steps of:

(i.1) depositing a mask layer on a portion of said second assembly;

(i.2) etching the surface of said second assembly until said second assembly has a planar surface; and (i.3) etching all of said second assembly planar surface until said fifth layer material is exposed to the surface.

20. The method of claim 12 wherein, said removing steps (g) and (j) are performed through subtractive etching by a solvent.

21. The method of claim 12 wherein said defining steps (f) and (k) include the step of:

depositing a photoresist layer over the respective structure.

22. The method of claim 12 wherein said removing step (i) includes the step of:

(i.1) lapping said second assembly to remove all material above said plane.

* * * * *